United States Patent Office 2,713,208
Patented July 19, 1955

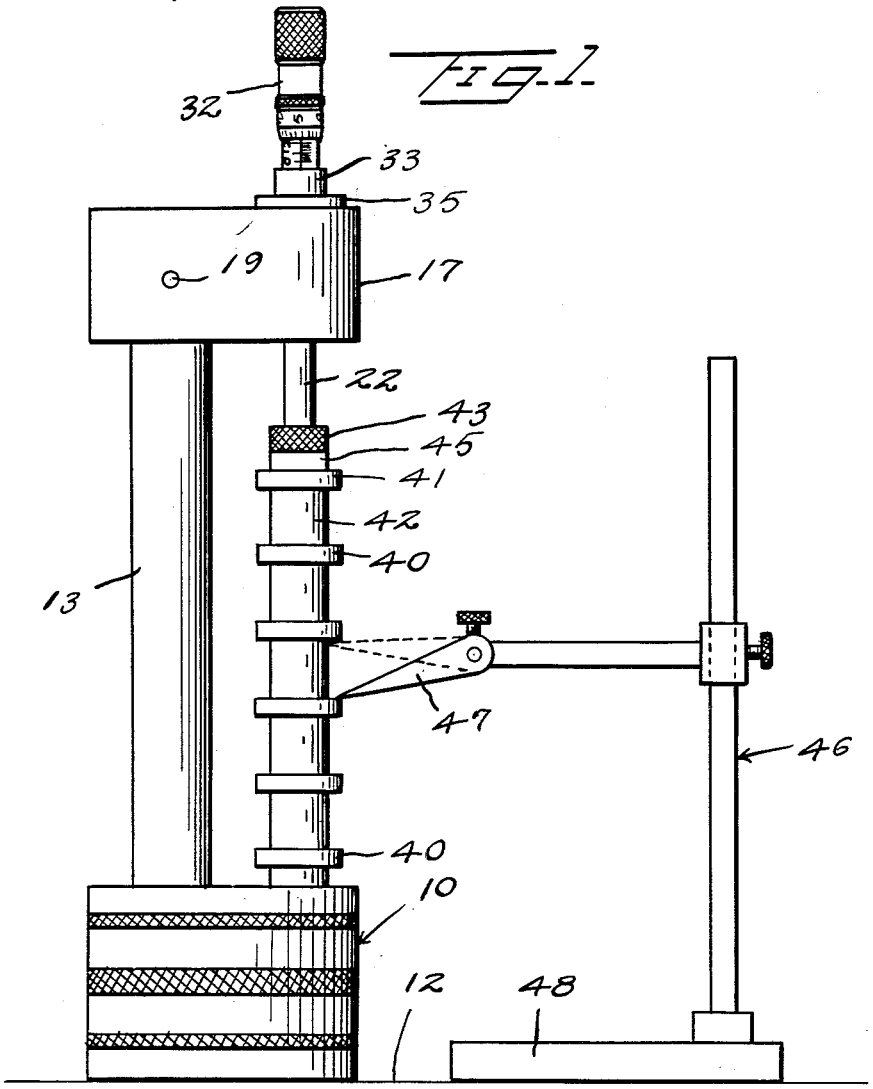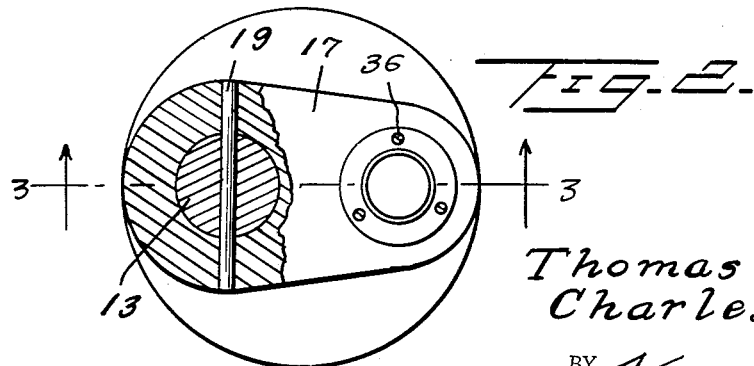

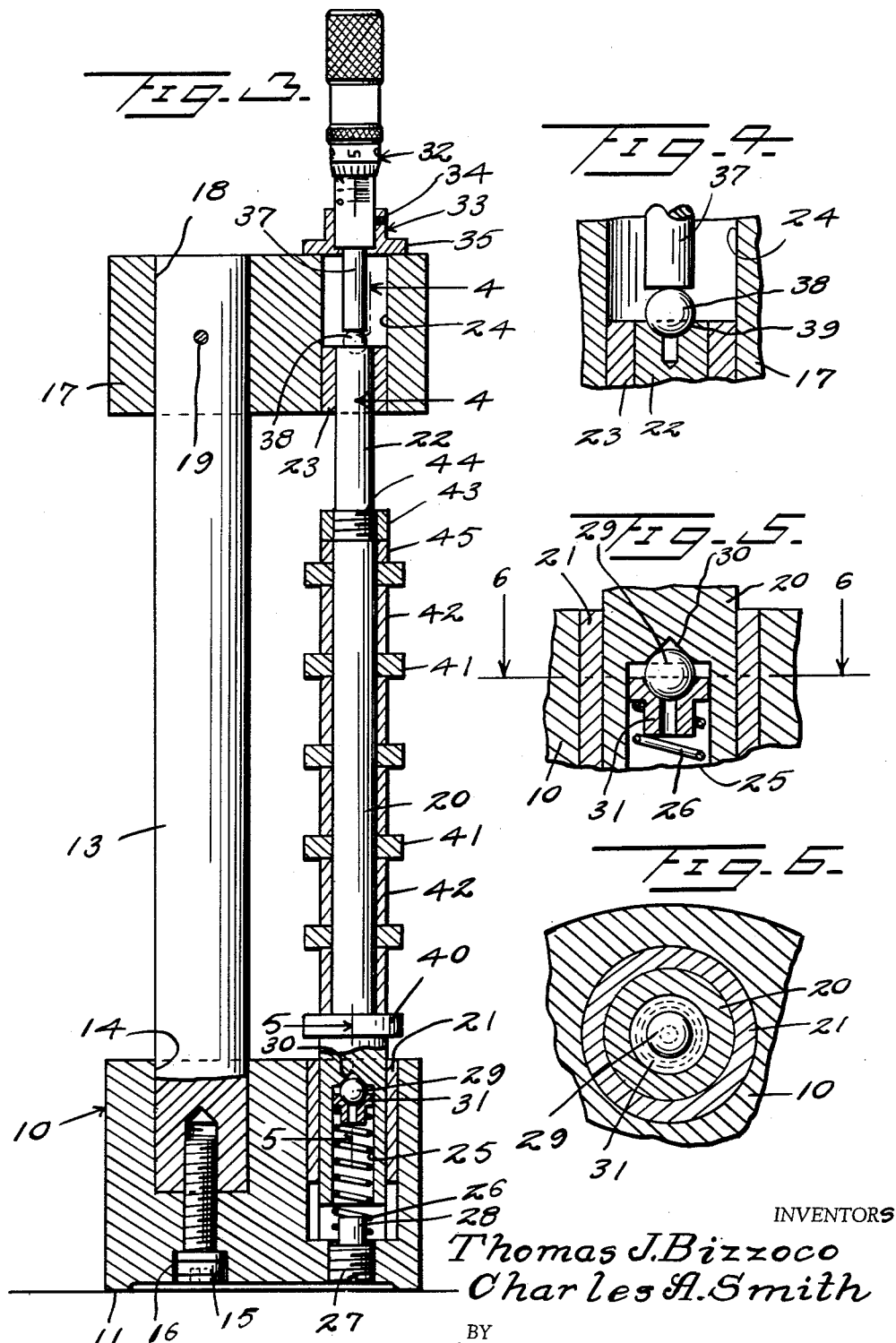

2,713,208

HEIGHT GAUGE

Thomas J. Bizzoco, Bronx, and Charles A. Smith, Merrick, N. Y.

Application February 17, 1953, Serial No. 337,314

3 Claims. (Cl. 33—170)

This invention relates to a height gauge.

An object of this invention is to provide a height gauge by means of which measurements may be made on a precision basis and without the necessity of determining the height by mathematical calculations.

Another object of this invention is to provide a height gauge which is simple in construction and can be produced at moderate cost.

A further object of this invention is to provide a height gauge which is adapted to be used with a conventional height indicator or surface gauge on a precision flat surface in combination with a tubular micrometer.

With the above and other objects in view, our invention consists in the arrangement, combination and details of construction disclosed in the drawings and specification, and then more particularly pointed out in the appended claims.

In the drawings—

Figure 1 is a detailed side elevation of a height gauge constructed according to an embodiment of this invention, Figure 2 is a plan view, partly broken away and in section, of the gauge, Figure 3 is a vertical section taken on the line 3—3 of Figure 2, Figure 4 is a fragmentary sectional view taken on the line 4—4 of Figure 3, Figure 5 is a fragmentary sectional view taken on the line 5—5 of Figure 3, Figure 6 is a fragmentary sectional view taken on the line 6—6 of Figure 5.

Referring to the drawings, the numeral 10 designates generally a base which in the present instance is round in transverse section and is formed with a bottom surface 11 which is precision flat for accurate engagement on a precision flat surface 12.

The base 10 has extending upwardly therefrom a supporting bar 13 which engages at its lower end in a socket 14 formed in the base 10. A bolt or screw 15 which is countersunk in a counterbore 16 secures the supporting member 13 in upright or vertical position with respect to the base 10.

A block 17 is mounted on the upper end of the supporting member 13, being formed with a bore 18 within which the supporting member 13 snugly engages, and a securing pin 19 extends through the block 17 and the supporting member 13 so as to hold the block or head 17 against movement relative to the supporting member 13.

A vertically disposed and endwise movable shaft 20 is disposed between the base 10 and the head or block 17 and is slidable at its lower end in a bushing 21 which is positioned in the base 10. The shaft 20 is parallel with the supporting member 13 and the upper end of the shaft 20 is reduced, as indicated at 22, and is slidable in a bushing 23 which is secured in a bore 24 formed in the head block 17 spaced from the supporting member 13.

The lower end of the shaft 20 is formed with a counterbore 25 within which a spring 26 engages, and a spring tensioning screw 27 having a stud 28 is threaded into the base 10 and provides a means for tensioning the spring 26 so as to constantly urge the shaft 20 upwardly.

In order to eliminate friction between the spring 26 and the shaft 20 a spherical member 29 is disposed in the upper end of the counterbore 25 and engages on a conical seat 30 which is formed in the upper end of the counterbore 25. A slidable seat member 31 is interposed between the upper end of the spring 26 and the spherical member 29.

A tubular micrometer 32 of conventional construction is secured in the bushing 33 by means of a set screw 34 and the bushing 33 which is formed with a flange 35 is secured by fastening means 36 to the upper side of the head block or member 17. The gauge element 37 of the micrometer 32 extends downwardly through the bushing 33 and bears at its lower end against a spherical anti-friction member 38 which is mounted in a ball seat 39 formed in the upper end of the shaft extension 22.

The shaft 20 is formed adjacent the lower end thereof with an integral collar or annular flange 40 which in the lower position of the shaft 20 is adapted to bear against the upper side of the base 10. A series of vertically spaced apart collars or rings 41 are also disposed about the shaft 20 and are held in spaced apart relation by means of sleeves 42. The sleeves 42 and the collars or rings 41 are accurately machined and lapped so that the distance from the upper side of a lower collar or ring 41 to the upper side of a succeeding collar or ring will be, in the present instance, 1-inch to a precision dimension of approximately $\frac{1}{10,000}$ of an inch. In other words, each collar or ring 41 has a thickness of ¼ inch and each sleeve 42 has a length of ¾-inch.

The collars or rings 41 and sleeves 42 are tightly held against endwise movement on the shaft 20 by means of a nut 43 which is threaded as at 44 on the upper end of the shaft 20. A spacer collar 45 is interposed between the upper ring or collar 41 and the nut 43.

In the use of this height gauge the base 10 is disposed on a precision flat surface 12 and the height of the element which is to be gauged is initially taken by means of a height indicator generally designated as 46. The height indicator 46 includes a finger 47 which is adjusted relative to the base 48. When the finger 47 has been adjusted relative to the element which is to be gauged as to height, the base 48 is disposed on the flat surface 12 and the finger 47 is then disposed in confronting position to the nearest collar 41 on the shaft 20 and may engage either the upper or lower side of the nearest collar 41. The micrometer 32 is then adjusted vertically and with vertical adjustment of the micrometer 32 spring 26 will move shaft 20 upwardly or downwardly so that the nearest collar 41 will contact with the end of the finger 47.

The base 10 has a predetermined height which is, in the present instance, 2½-inches so that when the lower collar 41 is contacting with the base 10, the initial calculation reads from 2¾-inches on the upper sides of collars 40 and 41, or the initial calculation reads from 2½-inches on the lower sides of collars 40 and 41. If for instance the height of the finger 47 is over 5-inches the finger 47 will be disposed close to the second or third one of the lower collars or rings 41.

Endwise adjustment of the micrometer 32 will then effect movement of shaft 20 until the nearest one of the collars 41 contacts with the end of the finger 47. The exact height of the finger 47 from the flat surface 12 may then be read on the micrometer 32 with the addition of 5-inches and the fraction indicated by the micrometer.

We do not mean to confine ourselves to the exact details of construction herein disclosed, but claim all variations falling within the purview of the appended claims.

What we claim is:

1. A precision height gauge comprising a base member, an upstanding supporting member fixed to said base member, a head block fixed to the upper end of said supporting member, a vertically disposed shaft slidable at its lower end in said base member and slidable at its upper end in said head block, tensionable means carried by said base including a spring-biased spherical anti-friction member constantly urging said shaft upwardly, a plurality of vertically spaced apart collars carried by said shaft, and a micrometer carried by said head block engaging the upper end of said shaft.

2. A precision height gauge comprising a base member, an upstanding supporting member fixed to said base member, a head block fixed to the uper end of said supporting member, a vertically disposed shaft slidable at its lower end in said base member and slidable at its upper end in said head block, tensionable means carried by said base including a spring-biased spherical anti-friction member constantly urging said shaft upwardly, a lower collar integral with said shaft and engageable with the upper side of said base member in the zero position of said shaft, a plurality of vertically equidistantly spaced apart collars on said shaft, spacer sleeves between said collars, means securing said collars and sleeves against movement relative to said shaft, and a micrometer carried by said head block engaging the upper end of said shaft.

3. A precision height gauge comprising a base member, an upstanding supporting member fixed to said base member, a head block fixed to the upper end of said supporting member, a vertically disposed shaft slidable at its lower end in said base member and slidable at its upper end in said head block, tensionable means carried by said base including a spring-biased spherical anti-friction member constantly urging said shaft upwardly, a lower collar integral with said shaft and engageable with the upper side base member in the zero position of said shaft, a plurality of vertically equidistantly spaced apart collars on said shaft, spacer sleeves between said collars, means securing said collars and sleeves against movement relative to said shaft, a micrometer carried by said head block, and an anti-friction means interposed between said micrometer and the upper end of said shaft.

References Cited in the file of this patent

UNITED STATES PATENTS

| | | |
|---|---|---|
| 2,421,440 | Thorpe | June 3, 1947 |
| 2,440,710 | Bauer | May 4, 1948 |
| 2,515,583 | Bennett | July 18, 1950 |
| 2,544,004 | Bauer | Mar. 6, 1951 |

FOREIGN PATENTS

| | | |
|---|---|---|
| 556,181 | Great Britain | Sept. 23, 1943 |